US007094011B2

(12) United States Patent
Kopras et al.

(10) Patent No.: US 7,094,011 B2
(45) Date of Patent: Aug. 22, 2006

(54) POWER TOOL

(75) Inventors: Robert K. Kopras, Black Earth, WI (US); Jason R. Kopras, Blue Mounds, WI (US); Scott Adler, Madison, WI (US); Douglas Seals, Fitchburg, WI (US); Ryan Rindy, McFarland, WI (US); Larry Gunseor, New Glarus, WI (US); Daniel Bullis, Madison, WI (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 11/095,869

(22) Filed: Mar. 31, 2005

(65) Prior Publication Data

US 2005/0166741 A1 Aug. 4, 2005

Related U.S. Application Data

(60) Continuation of application No. 10/924,604, filed on Aug. 24, 2004, now Pat. No. 6,890,135, which is a continuation of application No. 10/373,144, filed on Feb. 24, 2003, now abandoned, which is a continuation-in-part of application No. 10/189,899, filed on Jul. 3, 2002, now abandoned, which is a division of application No. 09/506,244, filed on Feb. 17, 2000, now Pat. No. 6,443,675.

(51) Int. Cl.
*B23C 1/20* (2006.01)
*B23Q 11/00* (2006.01)

(52) U.S. Cl. ................. 409/137; 409/182; 144/136.95; 144/252.1; 83/98; 83/168; 30/124; 29/DIG. 82; 29/DIG. 83

(58) Field of Classification Search ................ 409/182, 409/137, 134; 144/136.95, 154.5, 252.1, 144/252.2; 83/168, 100, 98; 30/124, 133; 451/444, 449, 456; 29/DIG. 83, DIG. 82
See application file for complete search history.

(56) References Cited

U.S. PATENT DOCUMENTS

| | | | | |
|---|---|---|---|---|
| 1,423,511 | A | | 7/1922 | Baker |
| 1,581,719 | A | | 4/1926 | Carter |
| 1,635,769 | A | * | 7/1927 | Royle ......................... 416/237 |
| 1,990,017 | A | * | 2/1935 | Hermann et al. ............. 173/75 |
| 2,155,082 | A | * | 4/1939 | Decker ....................... 173/217 |
| 2,193,878 | A | | 3/1940 | Martin |
| 2,263,136 | A | | 11/1941 | Knouse et al. |
| 2,310,166 | A | | 2/1943 | Way |
| 2,452,268 | A | * | 10/1948 | Schumann ............ 29/DIG. 83 |
| 2,517,882 | A | | 8/1950 | Johnson |
| 2,525,588 | A | | 10/1950 | Cameron et al. |
| 2,736,792 | A | | 2/1956 | Freeland |

(Continued)

FOREIGN PATENT DOCUMENTS

DE 2529668 A1 1/1977

(Continued)

OTHER PUBLICATIONS

Printout from www.dremel.com; product description of #677 Dremelite; 1 pg.; copyright 2000.

(Continued)

*Primary Examiner*—Erica Cadugan
(74) *Attorney, Agent, or Firm*—Foley & Lardner LLP

(57) ABSTRACT

A hand-held power tool includes a housing having a motor provided therein, a cutting accessory coupled to the motor and means for selectively directing a flow of air toward a point of cut of the cutting accessory. The flow of air acts to remove debris at the point of cut to improve visibility of the workpiece.

26 Claims, 10 Drawing Sheets

U.S. PATENT DOCUMENTS

| | | | | | |
|---|---|---|---|---|---|
| 2,822,615 | A | | 2/1958 | Durst et al. | |
| 2,842,173 | A | | 7/1958 | Turner et al. | |
| 2,852,051 | A | | 9/1958 | Bickner | |
| 2,855,679 | A | | 10/1958 | Gibble | |
| 2,918,955 | A | | 12/1959 | Simas | |
| 3,117,480 | A | | 1/1964 | Peddinghaus | |
| 3,327,749 | A | | 6/1967 | Hunn | |
| 3,767,876 | A | | 10/1973 | Batson | |
| 3,767,948 | A | * | 10/1973 | Batson | 144/136.95 |
| 3,919,541 | A | | 11/1975 | Chao | |
| 3,919,573 | A | | 11/1975 | Schmuck | |
| 3,977,278 | A | | 8/1976 | Jackson | |
| 4,050,003 | A | | 9/1977 | Owings et al. | |
| 4,078,869 | A | | 3/1978 | Honeycutt | |
| 4,283,757 | A | | 8/1981 | Nalbandian et al. | |
| 4,306,264 | A | | 12/1981 | Alessio | |
| 4,381,037 | A | | 4/1983 | Cuneo | |
| 4,513,381 | A | | 4/1985 | Houser, Jr. et al. | |
| 4,545,121 | A | | 10/1985 | Armbruster et al. | |
| 4,561,845 | A | | 12/1985 | Meller | |
| 4,653,356 | A | | 3/1987 | Golden | |
| 4,689,534 | A | | 8/1987 | Gerber et al. | |
| 4,730,397 | A | * | 3/1988 | Weiford et al. | 30/392 |
| 4,796,682 | A | | 1/1989 | Michaels | |
| 4,808,862 | A | | 2/1989 | Carvalho et al. | |
| 4,820,090 | A | | 4/1989 | Chen | |
| 4,833,782 | A | | 5/1989 | Smith | |
| 4,856,195 | A | | 8/1989 | Grossmann et al. | |
| 4,932,294 | A | | 6/1990 | Chang | |
| 4,938,642 | A | | 7/1990 | Imahashi et al. | |
| 5,029,706 | A | | 7/1991 | McCracken | |
| 5,074,081 | A | | 12/1991 | Beth et al. | |
| D323,935 | S | * | 2/1992 | Ward | D3/282 |
| 5,099,160 | A | | 3/1992 | Strözel et al. | |
| 5,158,354 | A | | 10/1992 | Simonin | |
| 5,169,225 | A | | 12/1992 | Palm | |
| 5,238,336 | A | | 8/1993 | Sanders et al. | |
| 5,257,654 | A | | 11/1993 | Bean et al. | |
| 5,265,657 | A | | 11/1993 | Matsumoto et al. | |
| 5,267,129 | A | | 11/1993 | Anderson | |
| 5,323,823 | A | | 6/1994 | Kopras | |
| 5,412,546 | A | | 5/1995 | Huang | |
| 5,445,479 | A | | 8/1995 | Hillinger | |
| 5,466,183 | A | | 11/1995 | Kirn et al. | |
| 5,473,519 | A | | 12/1995 | McCallops et al. | |
| 5,530,301 | A | | 6/1996 | Fu et al. | |
| 5,553,675 | A | | 9/1996 | Pitzen et al. | |
| 5,558,570 | A | | 9/1996 | Nakamura et al. | |
| 5,632,578 | A | * | 5/1997 | McCurry et al. | 144/252.1 |
| 5,694,992 | A | | 12/1997 | Kikuchi | |
| 5,793,130 | A | | 8/1998 | Anderson | |
| 5,797,670 | A | | 8/1998 | Snoke et al. | |
| 5,813,805 | A | | 9/1998 | Kopras | |
| 5,902,080 | A | | 5/1999 | Kopras | |
| 5,974,674 | A | | 11/1999 | Kelly | |
| 5,982,059 | A | | 11/1999 | Anderson | |
| 6,067,714 | A | | 5/2000 | Taylor et al. | |
| 6,161,994 | A | * | 12/2000 | Lang | 409/137 |
| 6,206,538 | B1 | | 3/2001 | Lemoine | |
| 6,318,874 | B1 | | 11/2001 | Matsunaga | |
| 6,328,505 | B1 | | 12/2001 | Gibble | |
| 6,443,675 | B1 | | 9/2002 | Kopras et al. | |
| 6,494,590 | B1 | | 12/2002 | Paganini et al. | |
| 6,533,432 | B1 | | 3/2003 | Alender | |
| 6,565,227 | B1 | | 5/2003 | Davis | |
| 6,575,590 | B1 | | 6/2003 | Wadsworth | |
| 6,779,612 | B1 | * | 8/2004 | Nishikawa et al. | 173/217 |
| 6,890,135 | B1 | * | 5/2005 | Kopras et al. | 409/182 |
| 6,912,788 | B1 | * | 7/2005 | Tam et al. | 30/124 |
| 6,951,232 | B1 | * | 10/2005 | McDonald et al. | 144/136.95 |
| 6,962,523 | B1 | * | 11/2005 | Fraser et al. | 451/359 |
| 2002/0048166 | A1 | | 4/2002 | Matsunaga | |
| 2002/0105794 | A1 | | 8/2002 | Hanscom et al. | |
| 2002/0131834 | A1 | | 9/2002 | Lui et al. | |
| 2002/0172035 | A1 | | 11/2002 | Hara et al. | |
| 2002/0197123 | A1 | | 12/2002 | Kopras et al. | |
| 2003/0042803 | A1 | | 3/2003 | Hirschburger et al. | |
| 2003/0095402 | A1 | | 5/2003 | Lin | |
| 2003/0147709 | A1 | | 8/2003 | Hara et al. | |
| 2004/0035495 | A1 | * | 2/2004 | Hessenberger et al. | 144/136.95 |
| 2004/0172833 | A1 | * | 9/2004 | Tam et al. | 30/124 |

FOREIGN PATENT DOCUMENTS

| | | | | |
|---|---|---|---|---|
| DE | 3831344 | A1 | | 3/1990 |
| DE | 4326652 | A1 | | 1/1994 |
| DE | 4435573 | A1 | | 4/1996 |
| DE | 19503526 | A1 | | 8/1996 |
| DE | 19532298 | A1 | | 3/1997 |
| DE | 19628946 | A1 | | 1/1998 |
| DE | 19646863 | A1 | | 5/1998 |
| DE | 29807070 | U1 | | 7/1998 |
| EP | 878273 | A2 | | 11/1998 |
| EP | 1068934 | A1 | | 1/2001 |
| EP | 1072842 | A2 | | 1/2001 |
| EP | 1100218 | A2 | | 5/2001 |
| FR | 2523891 | | | 9/1983 |
| GB | 1147630 | A | * | 4/1969 |
| GB | 2062361 | A | * | 5/1981 |
| GB | 2112585 | A | * | 7/1983 |
| GB | 2305719 | A | | 4/1997 |
| JP | 5656313 | | | 5/1981 |
| JP | 6246645 | A | | 9/1994 |
| WO | WO 9902310 | A2 | | 1/1999 |

OTHER PUBLICATIONS

Printout from www.dremel.com; product description of #9000-04 Advantage Rotary Saw ™ Kit; 2 pgs.; copyright 2000.
MSC Catalog; 1995-96 edition; p. 1525.
Merlaku K.; “Method for illuminating work area of electric drill”; Mar. 20, 2003; Abstract and Figure for DE 20215382 U1.
Ryobi Limited Annual Report; 2002.
Printout from www.makitaope.com; “eLuminate Series Provides More Light & Accurate Work”; 1 pg.; Printed Jul. 1, 2003.
Printout from www.makitaope.com; “1235F-12V (3.0Ah) Ni-MH Battery with LED Light”; 1 pg.; Printed Jul. 1, 2003.
Printout from www.makitaope.com; “New eLuminate Series Highlights 12V Battery with LED”; press Release date Aug. 11, 2002; 2 pgs.
Partial European Search Report; 3 pgs.; European Patent No. EP 01 10 0218; date of completion of search Dec. 13, 2001.

* cited by examiner

POWER TOOL

CROSS-REFERENCE TO RELATED PATENT APPLICATIONS

This application is a continuation of U.S. patent application Ser. No. 10/924,604 filed Aug. 24, 2004 (now U.S. Pat. No. 6,890,135), which is a continuation of U.S. patent application Ser. No. 10/373,144 filed Feb. 24, 2003 (now abandoned), which is a continuation-in-part of U.S. patent application Ser. No. 10/189,899 filed Jul. 3, 2002 (now abandoned), which is a division of U.S. patent application Ser. No. 09/506,244 filed Feb. 17, 2000 (now U.S. Pat. No. 6,443,675). The entire disclosures of U.S. patent application Ser. No. 10/924,604, U.S. patent application Ser. No. 10/373,144 (now abandoned), U.S. patent application Ser. No. 10/189,899 (now abandoned), and U.S. patent application Ser. No. 09/506,244 (now U.S. Pat. No. 6,443,675) are expressly incorporated by reference herein.

BACKGROUND

The invention relates generally to hand-held power tools. More specifically, the invention relates to hand-held power tools having a fan.

Hand-held power tools, such as hand-held power cutting tools, generally include a housing and an electric motor contained within the housing. The motor is configured to move a tool bit or other cutting accessory at high speeds to form cuts in a workpiece (e.g., a piece of wood, etc.). For example, a rotary cutting tool is a hand-held power tool that includes an electric motor that rotates a tool bit at high speeds. One type of tool bit that may be used with a rotary cutting tool is a helical or spiral cutting tool bit that includes a sharp cutting edge wrapped in a helix around the axis of the bit.

Hand-held power cutting tools are used to remove material from a workpiece, for example, by forming cuts in the workpiece. In the above example of a rotary cutting tool having a rotating helical cutting tool bit, the tool bit is moved through the workpiece in a direction perpendicular to the axis of rotation of the bit to remove material from the workpiece.

Precise control of a cut being made by a hand-held power cutting tool requires that the user of the tool have good visibility of the workpiece at the point of the cut. Such visibility can be reduced by a build-up of cutting debris (e.g., sawdust) and poor lighting at the point of the cut. Some power tools employ vacuum systems connected to the tool to remove cutting debris. However, the use of such a vacuum system often makes use of the tool more cumbersome. Proper lighting at the point of a cut can be a problem, both in generally poorly lighted construction environments and, more generally, in any environment where the operator of the tool and the tool itself cast a shadow over the workpiece.

There is a need for a hand-held power tool that allows increased visibility at the point of a cut made in a workpiece. There is also a need for a hand-held power tool that includes a way to remove debris from at least a portion of the workpiece. There is also a need to provide a hand-held power tool that includes the ability to selectively remove debris from the workpiece.

It would be desirable to provide a hand-held power tool that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment of the present invention relates to a hand-held power tool including a housing having a motor provided therein. The hand-held power tool also includes a cutting accessory coupled to the motor and means for selectively directing a flow of air toward a point of cut of the cutting accessory. The flow of air acts to remove debris at the point of cut to improve visibility of the workpiece.

Another exemplary embodiment of the present invention relates to a hand-held power tool that includes a housing having a motor provided therein. The hand-held power tool also includes a first air vent formed in a first end of the housing and an air vent cover provided in the housing and having an aperture formed therethrough. The air vent cover is movable between a first position and a second position. The first air vent and the aperture formed in the air vent cover are aligned in the first position to direct air through the first air vent toward a point of cut when the motor is activated.

Another exemplary embodiment of the present invention relates to a hand-held power tool that includes a motor provided in a housing. A first vent is provided in the housing and is configured to direct a flow of air toward a workpiece when the hand-held power tool is utilized to form cuts in the workpiece. A second vent is provided in a side of the housing and is configured for directing a flow of air in a direction away from the workpiece. A vent cover is provided in the housing that is configured to direct a flow of air through the first vent when the vent cover is in a first position and to restrict the flow of air through the first vent when the vent cover is in a second position.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
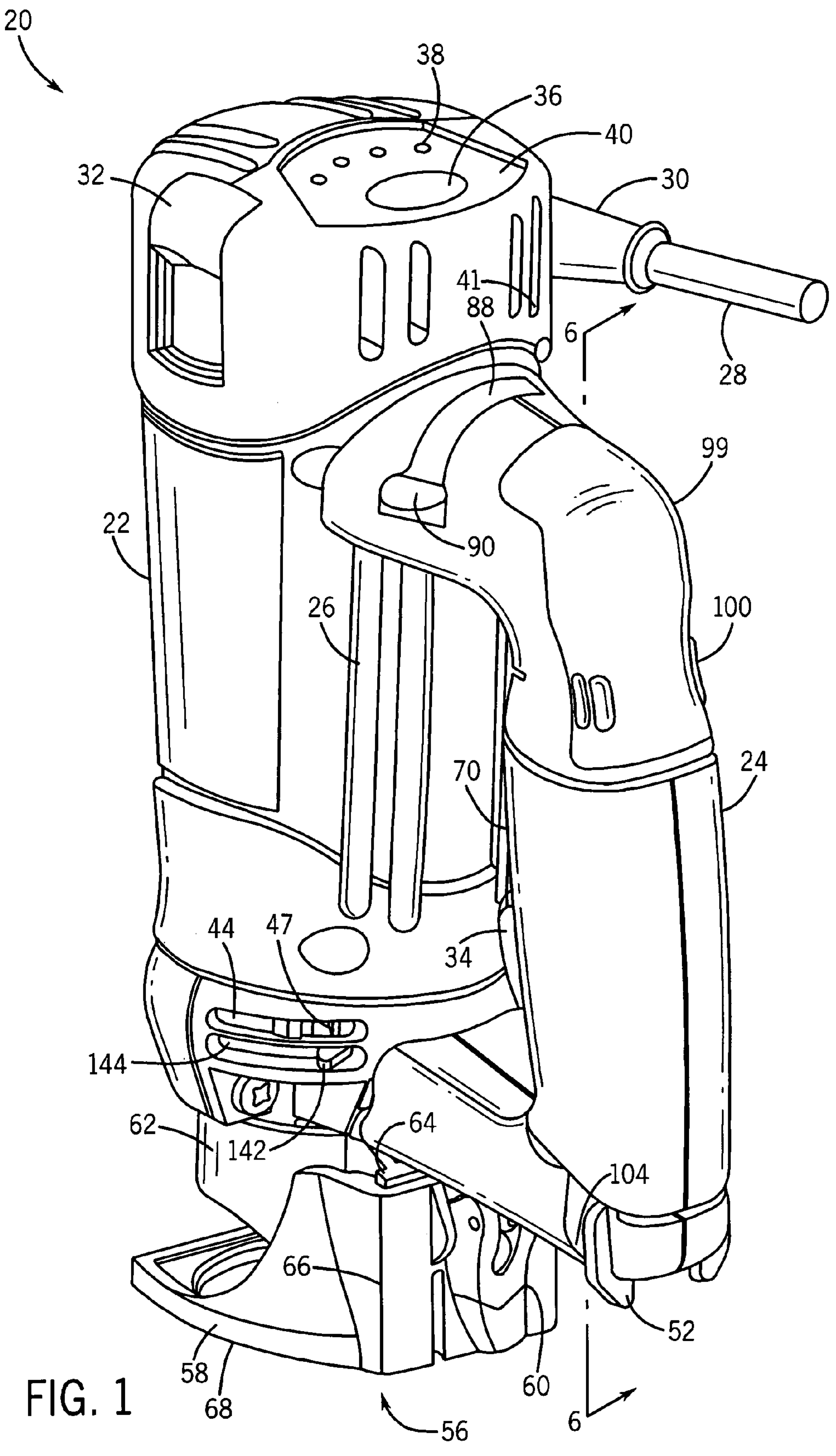
FIG. 1 is a perspective view of a hand-held power tool in accordance with an exemplary embodiment.
Figure 2:
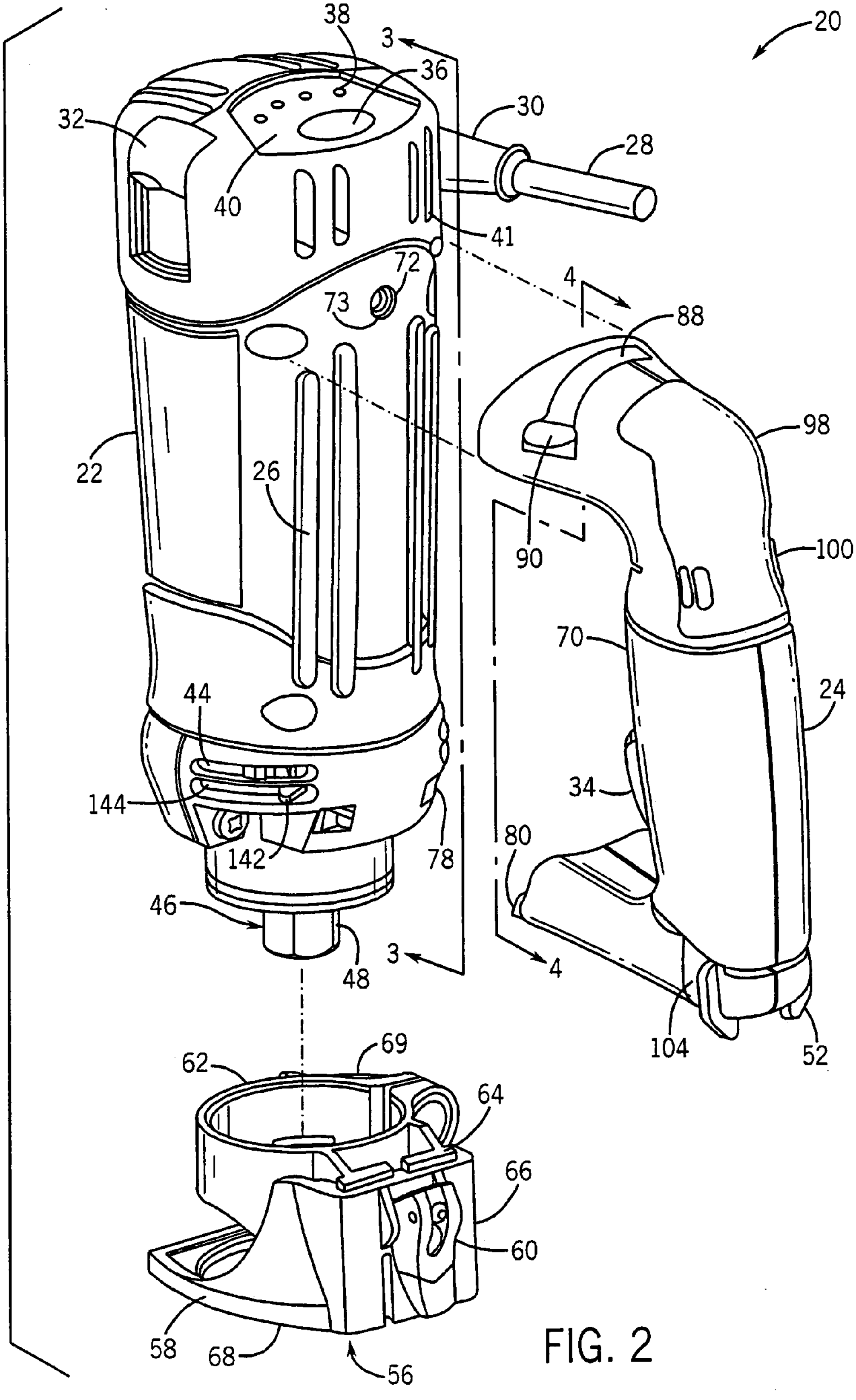
FIG. 2 is a perspective view of the hand-held power tool shown in FIG. 1, showing a detachable handle and adjustable depth guide assembly.

A hand-held rotary power or cutting tool 20 including features for improving the ability of an operator to operate and control the tool is shown generally in FIGS. 1 and 2. It should be understood that, although the present invention will be described in detail herein with reference to the exemplary embodiment of a rotary cutting tool 20, the present invention may be applied to, and find utility in, other types of hand-held power tools as well.

The rotary cutting tool 20 includes a motor housing 22 to which a detachable handle 24 is attached. The motor housing 22 is preferably made of an electrically insulating material, such as hard plastic. The motor housing 22 is generally cylindrical in shape, and may include raised gripping surfaces 26 formed thereon that allow a firm grip on the rotary cutting tool 20 to be maintained when the rotary cutting tool 20 is grasped around the motor housing 22. The motor housing 22 may be formed as two or more molded pieces which are joined together to form the housing 22 in a conventional manner, such as using fasteners, an adhesive, welding, or a combination thereof.

An electric motor (not visible in FIGS. 1 and 2) is enclosed within the motor housing 22. The motor receives electrical power through an electrical cord 28 (only a portion of which is shown in FIGS. 1 and 2). The electrical cord 28 may preferably include a rubber cover that stays flexible in cold operating environments. A thick rubber connecting sleeve 30 is preferably provided where the electrical cord 28 is joined to the motor housing 22. This connecting sleeve 30 provides strain relief at the end of the electrical cord 28 to prevent crimping, cracking, and excessive wear of the cord 28 where it is joined to the rotary cutting tool 20.

Figure 10:
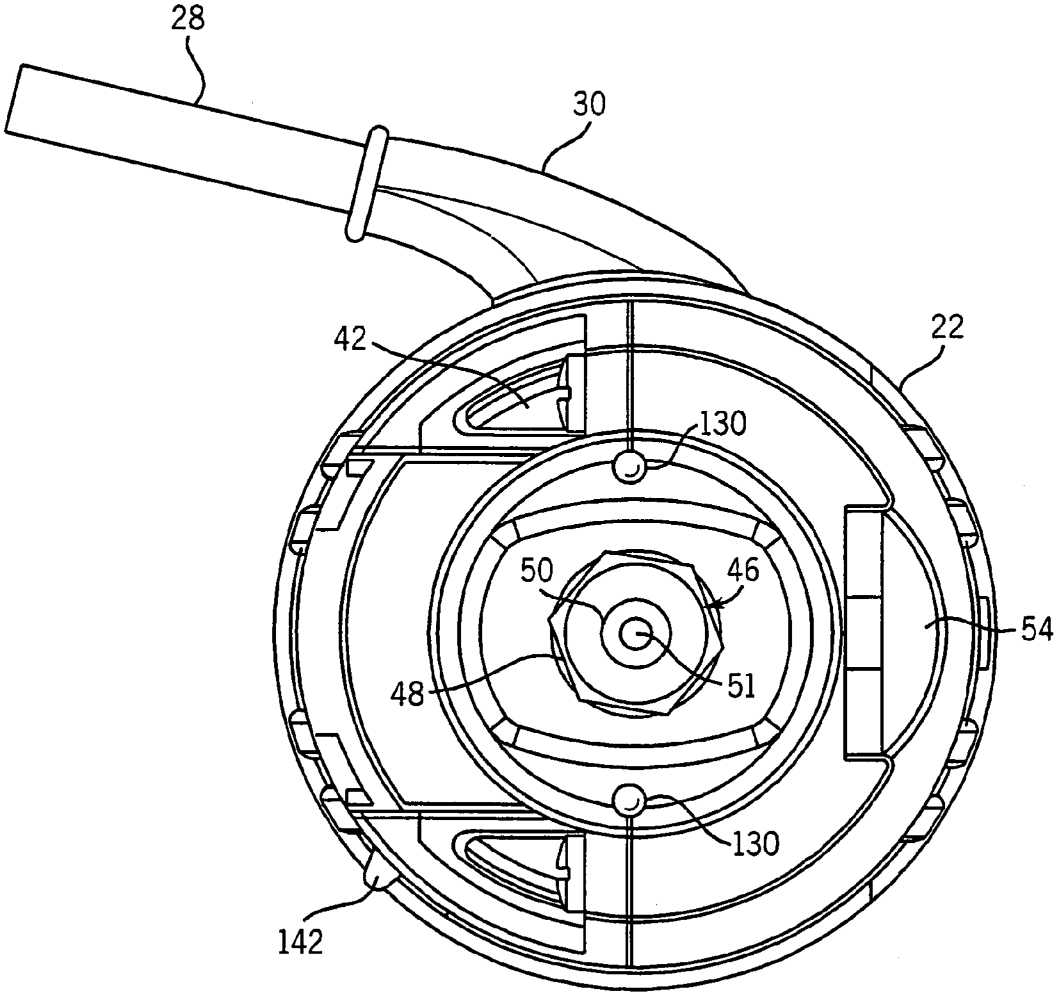
FIG. 10 is a bottom end view of the hand-held power tool shown in FIG. 1, showing an end of the hand-held power tool from which a shaft emerges, with LEDs and air vents provided in the end.

The connecting sleeve 30 is preferably made of a thicker or less pliable material than the rubber coating covering the electrical cord 28. As illustrated in FIGS. 1, 2, and 10, the connecting sleeve 30 preferably extends from a side of the motor housing 22 displaced radially from the position of the detachable handle 24 on the motor housing 22 by approximately 90°. The connecting sleeve 30 is bent or shaped to turn from the position where it is attached to the motor housing 22 in the direction of the position of the detachable handle 24 on the motor housing 22. Thus, the end of the electrical cord 28 which is connected by the connecting sleeve 30 to the tool 20 is positioned by the connecting sleeve 30 on the tool 20 such that the electrical cord 28 extends from the motor housing 22 in a direction toward an operator of the rotary cutting tool 20 holding the tool 20 by the detachable handle 24, but is displaced from the position of the handle 24. This positioning of the electrical cord 28 helps assure that the electrical cord 18 will not interfere with operation of the rotary cutting tool 22 as the tool 22 is used, e.g., to cut a workpiece.

The electric motor is turned on and off by a power on/off switch 32 mounted on the motor housing 22. As will be discussed in more detail below, the power on/off switch 32 is preferably a multiple-position on/off switch. The electric motor may also be turned on and off by a trigger switch 34 mounted on the detachable handle 24. As will also be discussed in more detail below, operation of the trigger switch 34 mounted in the detachable handle 24 to turn the electric motor on and off may be enabled by operation of the multiple position on/off power switch 32.

The electric motor is preferably capable of operation at a variety of speeds. A motor speed control button or switch 36 is provided on the motor housing 22 for controlling the operating speed of the tool motor. The motor speed control button 36 may be implemented as a push button switch which changes the speed of the motor each time the button 36 is depressed. Motor speed indicators, such as indicator LEDs 38, may be mounted on the motor housing 22 near the motor speed control switch 36 to indicate to an operator of the tool 20 the operating speed of the tool motor. The motor speed control switch 36 and motor speed indicators 38 may be covered (e.g., by a thin and flexible piece of plastic 40 attached to the motor housing 22 in a conventional manner) to prevent dust or other debris from entering the motor housing 22 and damaging or affecting operation of the button 36, indicators 38, or other components within the motor housing 22.

In an exemplary embodiment, the rotary cutting tool 20 includes an electric motor capable of being operated at four speeds. When the motor is first turned on (e.g., using the multiple-position on/off switch 32 or the trigger switch 34), the motor begins operation at an initial preselected speed (e.g., a no-load rotation speed of 15,000 RPM). Each the time the motor speed control button 36 is actuated with the motor on and running, the motor speed changes. For example, the motor speed may change from the initial 15,000 RPM to 20,000 RPM the first time the button 36 is actuated, from 20,000 RPM to 25,000 RPM the second time the button 36 is actuated, and from 25,000 RPM to 30,000 RPM the third time the button is actuated. When the motor speed control button 36 is actuated the fourth time with the motor on and running, the motor speed preferably decreases by one step, e.g., back to 25,000 RPM. In alternative embodiments, more or fewer than four motor speeds may be provided, different motor speeds may be provided, and different increments between available motor speeds may be provided in accordance with alternative embodiments. Also, the motor speed may be controlled to return to its initial operating speed upon the next actuation of the speed control button after either the highest or lowest operating speed is reached.

Appropriate ones of the motor speed indicator LEDs 38 are illuminated each time the motor speed control button 36 is actuated to indicate the operating speed of the motor. In alternative embodiments, the speed of the motor may be controlled in a different manner in response to actuation of the motor speed control button 36. For example, the tool motor may start operation at a relatively high initial operating speed, with the speed of the motor reduced each time the motor speed control button 36 is actuated, or may start at a relatively low initial operating speed, with the speed of the motor increased each time the motor speed control button 36 is actuated. Preferably, a microprocessor or similar digital device is employed as a motor controller, mounted in the motor housing 22, to control the ramp up and ramp down of the speed of the cutting tool motor each time the motor speed control button 36 is actuated, and to control the motor speed indicator LEDs.

The motor controller may preferably be programmed to soft start the motor when the on/off switch 32 is actuated to turn the motor on initially. That is, the motor controller may control the motor to increase the motor speed gradually to the initial operating speed when the motor is first turned on via the on/off switch 32. Note, however, that this soft start of the motor is preferably not employed when operation of the motor is started by actuation of the trigger switch 34, as will be described in more detail below.

The electric motor of the rotary cutting tool 20 drives a motor shaft. A fan 47 located within the motor housing 22, is preferably attached to the motor shaft. When the motor is turned on, the fan is rotated at a high speed to draw air through the motor housing 22 and across the electric motor to cool the motor. For this purpose, intake air vents 41 and exhaust air vents 42, 44 are preferably provided in the motor housing 22. Exhaust air vents 42 are formed in the end of the motor housing 22 (see FIG. 10) and exhaust air vents 44 are formed on the side 44 of the housing 22, at the end of the housing 22 opposite the intake air vents 41. Cool air is drawn by the motor fan into the motor housing 22 through the air intake vents 41 to cool the electric motor, with warm air exhausted from the motor housing 22 through the exhaust air vents 42 and 44. As will be discussed in more detail below, the flow of air out of the exhaust air vents 42 and 44 may be directed and controlled to remove, or to prevent the removal of, cutting debris from the point of a cut being made using the rotary cutting tool 20.

An end of the motor shaft extends from one end of the motor housing 22 along the axis thereof. Attached to the end of the motor shaft is a mechanical structure 46 for securing, e.g., a helical cutting tool bit or other accessory to the motor shaft. A helical or spiral cutting tool bit has a cutting edge wrapped around the axis of the bit in a helix. This cutting edge is designed such that the tool bit, when rotated at high speed, will cut through a workpiece in a direction perpendicular to the axis of the bit. In this cutting process, significant force is applied to the cutting tool bit perpendicular to the axis thereof. Thus, although a conventional drill-type chuck may be used for the structure 46 that mechanically connects the bit to the motor shaft, the preferred structure for securing the bit to the shaft is a collet-type system 46. As shown in FIG. 10, the collet bit attachment structure 46 includes a collet nut 48 and a collet 50 centered axially within a central aperture of the collet nut 48. The collet nut 48 is mounted on a threaded end of the motor shaft. To secure a bit to the motor shaft, a shank of the bit is inserted into a central aperture 51 of the collet 50. The collet nut 48 is then tightened, first by hand and then with a wrench 52, until the bit is held securely. As the collet nut 48 is tightened down on the threaded end of the shaft, the collet 50 is compressed within the collet nut 48 between a partially closed end of the collet nut 48 and the shaft. The collet 50 is slotted and has tapered ends such that when the collet 50 is compressed between the collet nut 48 and the shaft, the collet is compressed radially, causing the central aperture 51 of the collet 50 to close tightly around the shank of the tool bit. To remove the bit from the motor shaft, the collet nut 48 is loosened, using the wrench 52, until the bit can be removed easily from the central aperture 51 of the collet 50.

A shaft lock 54 (FIG. 10) is used to prevent rotation of the motor shaft when the collet nut 48 is being loosened and tightened. The shaft lock 54 includes a shaft lock pin which extends through the motor housing 22. When the shaft lock 54 is depressed, the shaft lock pin engages the motor shaft, preventing rotation of the shaft, and allowing the collet nut 48 to be loosened and tightened. When the shaft lock 54 is released, a spring (not shown) attached to the shaft lock 54 causes the shaft lock pin to become disengaged from the motor shaft, allowing free rotation thereof.

To set the depth of cut to be made by the rotary cutting tool 20, an adjustable depth guide assembly 56 may be provided. The depth guide assembly 56 includes a depth guide 58, a locking mechanism 60, and a depth guide bracket 62. The depth guide bracket 62 is attached to the rotary cutting tool housing 22 around the location where the motor shaft emerges from the housing 22.

Preferably, the depth guide bracket 62 may be made detachable from the housing 22. The depth guide bracket 62 may be attached to the housing 22 in any conventional manner. For example, the depth guide bracket 62 may be formed to have a split collar structure and a cam closing mechanism 69 which is operated to close the collar tight around the end of the tool housing 22 to attach the bracket 62 thereto, and which may be operated to loosen the collar to remove the bracket 62 from the housing 22. The depth guide bracket 62 includes an extension 64 extending in an axial direction therefrom. The depth guide 58 includes a corresponding extension 66 extending in an axial direction therefrom and which is aligned and coupled with the extension portion 64 of the depth guide bracket 62. The two extending portions 64 and 66 may be formed such that one of the extending portions 64 includes a tongue which may be extended into a groove formed in the other extending portion 66 to join the depth guide 58 and depth guide bracket 62 together while keeping the axially extending portion 66 of the depth guide 58 aligned on the same axis with the axially extending portion 64 of the depth guide bracket 62.

The depth of cut may be set by moving the depth guide 58 in an axial direction, by sliding the axially extending portion 66 thereof along the axially extending portion 64 of the depth guide bracket 62. The locking mechanism 60 is then engaged to lock the extending portions 64 and 66 together to securely fix the depth guide 58 in place. The locking mechanism 60 may be implemented as a cam lever 60, as shown, mounted on the extending portion 66 of the depth guide 58 and coupled to the extending portion 64 of the depth guide bracket 62 to lock the two extending portions 64 and 66 together tightly when the cam lever 60 is engaged. Alternatively, the locking mechanism may be implemented using a threaded nut or a screw for locking the extending portions 64 and 66 together tightly. When locked into position, the depth guide 58 provides a depth guide surface 68 which lies in a plane perpendicular to the axis of the rotary cutting tool 20. The main components which form the depth guide 56 may be molded of hard plastic, or alternatively may be made of any other suitable material.

The detachable handle 24 is preferably detachably attachable to the motor housing 22 of the rotary cutting tool 20. The handle 24 includes a gripping surface 70, which may be contoured in shape so that the handle 24 may be grasped comfortably in the hand by an operator of the rotary cutting tool 20. The handle gripping surface 70 is aligned substantially parallel with the axis of the rotary cutting tool housing 22. It should be understood that the term "substantially parallel" as used in this context throughout this specification means "more parallel than not." Therefore, the angle of the handle gripping surface 70 with respect to the axis of the rotary cutting tool 20 may be varied from exactly parallel by several degrees. The handle gripping surface 70 may be made of a semi-rigid plastic material or any other suitable material.

The handle 24 allows the rotary cutting tool 20 to be grasped more firmly and comfortably with both hands, to provide greater control of the tool 20 during operation, and thereby provides for more accurate cuts with less operator fatigue. The handle 24 also allows the rotary cutting tool 20 to be grasped more firmly during motor start-up, during which the reaction torque of the tool motor may cause the tool 20 to twist. Thus, the handle 24 also facilitates safe use of the tool 20. It may be desirable, however, that the handle 24 be detached for some applications. For example, for making cuts in close quarters or obstructed areas, the handle 24 may become an obstruction, and actually interfere with the making of accurate cuts. Thus, it is desirable to provide both for securely attaching the handle 24 to the rotary cutting tool 20 when needed and for easily detaching the handle 24 from the tool 20 when its use would interfere with operation of the tool 20.

Figure 3:
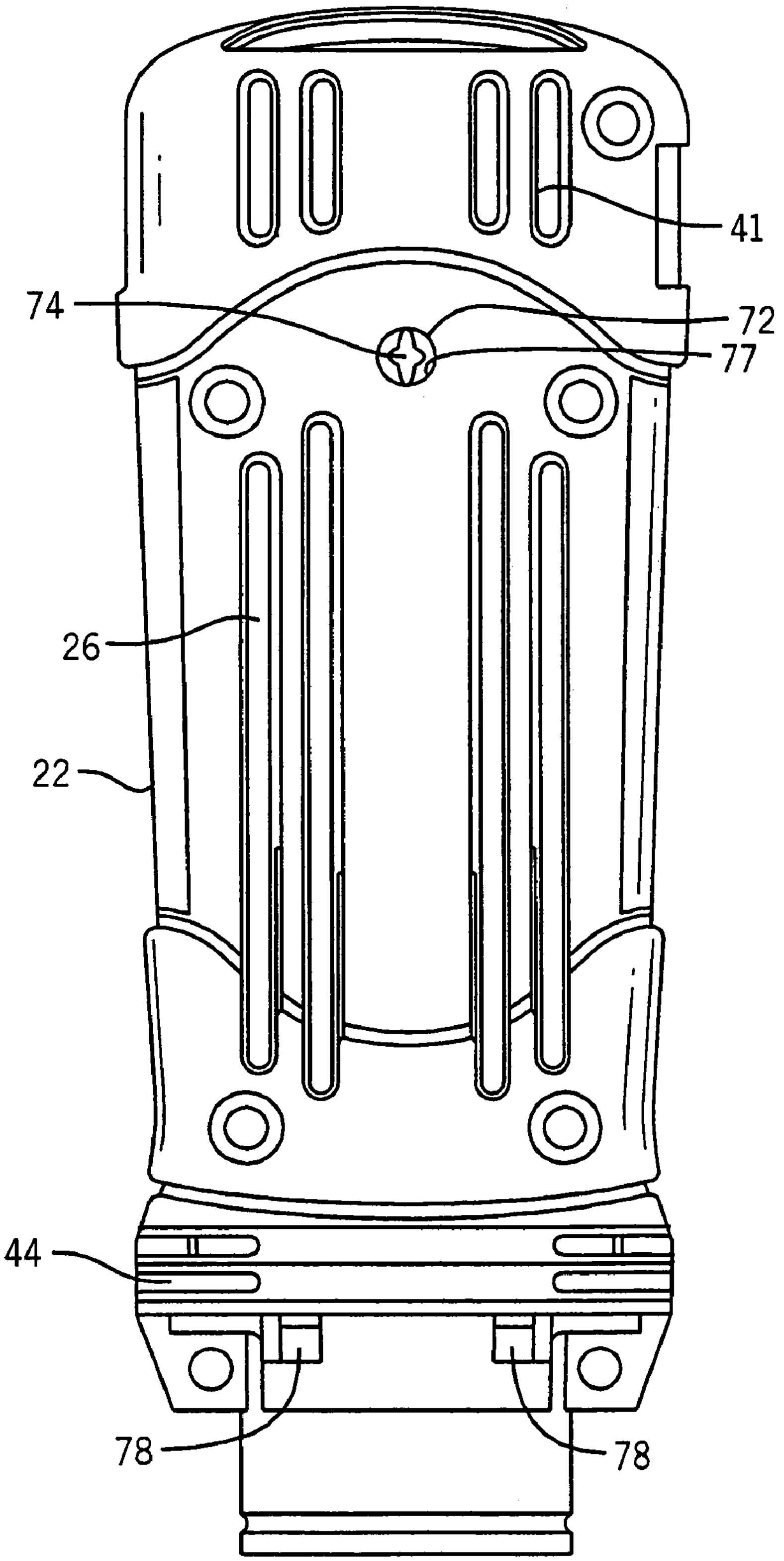
FIG. 3 is a partial side view of the hand-held power tool shown in FIG. 1, as taken along the line 3—3 in FIG. 2, showing apertures formed in the hand-held power tool housing.

A preferred structure for detachably attaching the handle 24 to the rotary cutting tool 20 is described in detail with reference to FIGS. 3–6. This structure provides for quick and easy release of the detachable handle 24 from the tool housing 22 and quick and secure attachment of the detachable handle 24 thereto. As shown in FIG. 3, the motor housing 22 preferably includes first 72 and second 78 fixed mounting structures formed therein for attaching the detachable handle 24 to the housing 22. For example, a first aperture 72 is formed on a side of the housing 22 to which the handle 24 is to be attached near an end of the housing 22 opposite the end of the tool 20 from which the motor shaft extends. As illustrated in FIG. 3, the first handle mounting aperture 72 preferably includes a slot aperture 74 formed therein. The slot aperture 74 may be formed in a metallic plate or insert 76 (FIG. 6) mounted within the housing 22 in a conventional manner behind the first housing aperture 72. A sidewall of the insert 76 may be threaded to form a threaded aperture wall 77 within the first aperture 72. One or more second mounting apertures 78 are formed in the side of the motor housing 22 near the end of the motor housing 22 from which the motor shaft emerges from the housing. In the preferred embodiment shown in the FIGURES, two such second mounting apertures 78 are formed in the motor housing 22. The first mounting aperture 72 and the second mounting apertures 78 are preferably positioned on the motor housing 22 with respect to each other such that when the detachable handle 24 is attached to the housing 22 in the manner to be described below, the handle gripping surface 70 is aligned substantially parallel with the axis of the rotary cutting tool housing 22.

The detachable handle 24 is attached to the housing 22 by a fixed handle mounting structure 80 formed on a first end of the handle, to be coupled to the second fixed mounting structure 78 formed in the housing 22, and a moveable mounting mechanism 82, mounted in a second end of the handle 24, to be coupled to the first fixed mounting structure 72 formed in the housing 22. For example, fixed extending handle tabs 80 may be formed at one end of the handle 24 for insertion into the corresponding second housing apertures 78, and a rotatable rod 82 may be mounted extending from the other end of the detachable handle 24 for insertion into the aperture slot 74 formed in the first housing aperture 72.

The extending handle tabs 80 may be integrally formed as part of the handle 24, or may be attached thereto in a conventional manner (e.g., using an adhesive, etc.). Alternatively, the tabs 80 may be implemented as a separate metal part attached to the handle 24. The tabs 80 preferably extend from one end of the handle and turn downward to form a hook-like configuration. The tabs 80 are preferably spaced apart on the end of the handle 24 such that the spacing between the tabs 80 corresponds to the spacing between the second apertures 78 formed in the housing 22. The hook shape of the tabs 80 allows the tabs 80 to be inserted into the apertures 78 in a manner such that the tabs 80 are hooked within the apertures 78 within and behind a portion of the housing 22. In other words, when the handle 24 is positioned on the housing 22 with the tabs 80 positioned properly in the apertures 78, the end of the handle with the tabs 80 extending therefrom cannot be removed in a radial direction from the housing 22, because the tabs 80 are hooked within the housing 22.

The rotatable rod 82 extends from the other end of the handle 24 (i.e., the end of the handle 24 opposite the end of the handle 24 having the extending tabs 80 extending therefrom). The rotatable rod 82 is positioned on the handle 24 such that the rotatable rod 82 may be inserted into the first aperture 72 formed in the housing 22, to position the handle 24 on the housing 22 when the extending handle tabs 80 are positioned in the housing apertures 78. The rotatable rod 82 preferably includes a radially extending and flattened portion 84 formed at a distal end thereof. A second radially extending portion 86 is preferably formed on the rotatable rod 82 proximal to the distal radially extending portion 84. The rotatable rod 82 is attached to a lever mechanism 88, which extends, at least in part, outside of the detachable handle 24. The portion of the lever 88 extending from the removable handle 24 preferably includes an extending tab 90. The extending tab 90 is positioned on the lever 88, and the lever 88 is positioned on the detachable handle 24, such that the lever 88 may be operated easily by, e.g., an operator's thumb positioned adjacent to the tab 90 when the handle 24 is grasped in a normal manner by the operator for use of the rotary cutting tool 20 to which the handle 24 is attached.

Figure 4:
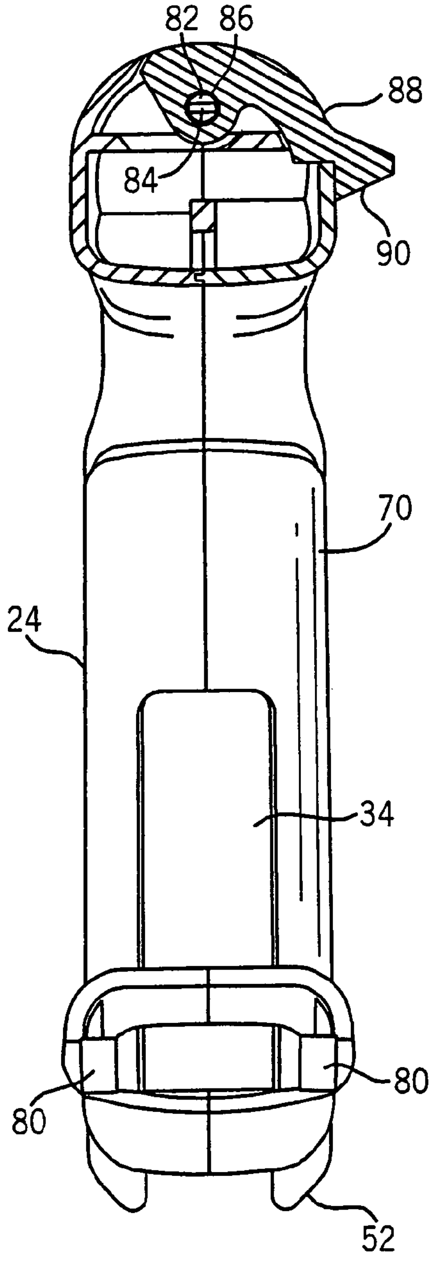
FIG. 4 is a front view, in partial cross-section, of a detachable handle for the hand-held power tool shown in FIG. 1, as taken along the line 4—4 in FIG. 2, showing a lever mechanism of a moveable mounting mechanism in a closed position.
Figure 5:
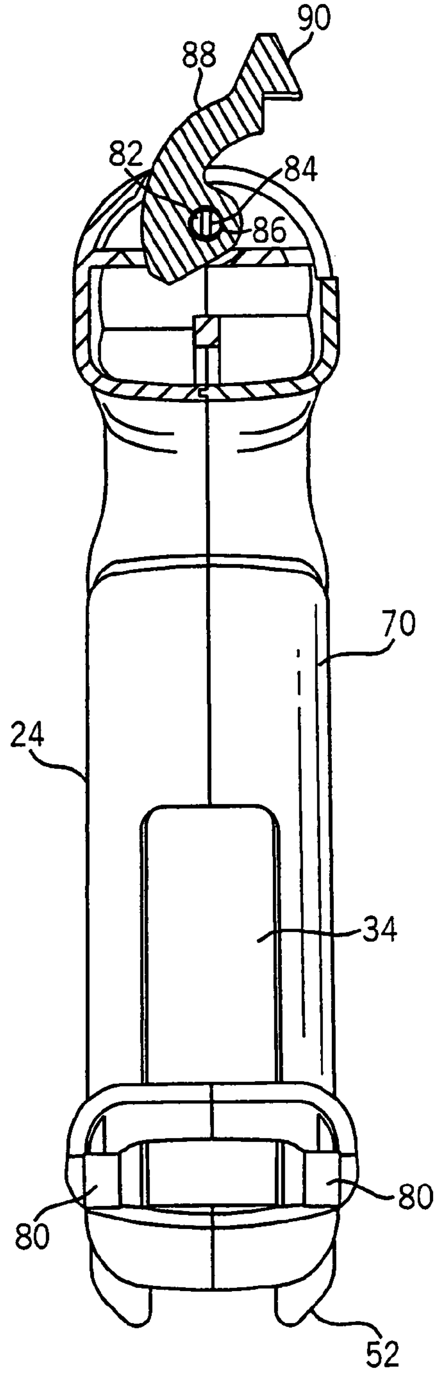
FIG. 5 is a front view, in partial cross-section, of a detachable handle for the hand-held power tool shown in FIG. 1, as taken along the line 4—4 in FIG. 2, showing a lever mechanism of a moveable mounting mechanism in an open position.

The lever mechanism 88 and rotatable rod 82 are mounted in the end of the detachable handle 24 in a conventional manner such that the rotatable rod 82 is rotatable therein by operation of the lever 88. When the lever mechanism 88 is rotated into an "open" position, as illustrated in FIG. 5, the radially extending and flattened distal portion 84 of the rotatable rod 82 is oriented such that the distal end 84 of the rod 82 may be inserted into the slot 74 formed in the first aperture 72 in the tool housing 22. The lever mechanism 88 is put into this "open" position for mounting the handle to, and removing the handle 24 from, the housing 22. When the lever mechanism 88 is rotated into a "closed" position, as illustrated in FIG. 4, the radially extending and flattened distal end 84 of the rotatable rod 82 is rotated into a position perpendicular to the orientation of the slot 74 formed in the first aperture 72 in the housing 22. In this position, the distal end 84 of the rotatable rod 82 cannot be inserted into the aperture 72, or removed therefrom, if the rod 82 has been positioned in the aperture 72. Thus, the lever mechanism 88 is operated to rotate the rotatable rod 82 into the "closed" position when the handle 24 is placed in the proper position on the housing 22, to secure the detachable handle 24 to the housing.

The detachable handle 24 is further securely attached to the housing 22 by interaction of the second radially extending portion 86 of the rotatable rod 82 with the threaded wall 77 of the first aperture 72 formed in the housing 22. The rotatable rod 82 is extended into the aperture 72 such that the second radially extending portion 86 thereof is positioned adjacent to the threaded wall 77 of the aperture 72. As the lever 88 is operated from the open position (FIG. 5) to the closed position (FIG. 4) to rotate the rotatable rod 82, the second radially extending portion 86 is rotated along the threading formed on the wall 77 of the aperture 72 to pull the rotatable rod 82 inward, thereby pulling the end of the handle 24 in which the rotatable rod 82 is mounted tightly against the housing 22. With the end of the handle 24 having the rotatable rod 82 extending therefrom pulled tightly against the housing 22, the handle 24 is secured tightly to the housing 22. That is, movement of the handle 24 with respect to the housing 22 is prevented.

The following method may, therefore, be employed to easily, quickly, and securely attach the detachable handle 24 to the tool housing 22, and to easily and quickly remove the handle 24 from the housing 22. The handle 24 is positioned such that the tabs 80 extending from one end of the handle 24 are aligned with the tab apertures 78 formed in the housing 22. The handle 24 is tilted backward slightly, and the ends of the hooked tabs 80 are extended into the apertures 78 such that the ends of the tabs 80 are engaged within the housing 22. With the tabs 80 hooked in the second apertures 78, the other end of the handle 24 is brought forward toward the first aperture 72 formed in the housing 22. With the lever 88 rotated into the open position (FIG. 5), the radially extending and flattened distal end 84 of the rotatable rod 82 is extended through the slot 74 formed in the aperture 72. With the distal end of the rotatable rod 82 extended into the slot 74, the second radially extending portion 86 of the rotatable rod 82 is engaged with the threads formed in the wall 77 of the first aperture 72. The lever 88 is then rotated from the open position (FIG. 5) to the closed position (FIG. 4). This rotates the rotatable rod 82 such that the radially extending and flattened distal end 84 of the rod 82 is rotated into an orientation perpendicular to the slot 74 formed in the aperture 72. This prevents the distal end 84 of the rod 82 from being removed from the aperture 72. The rotation of the lever 88 also causes the second radially extending portion 86 of the rod 82 to rotate in the threads formed in the wall 77 of the aperture 72, thereby pulling the end of the handle 24 tightly against the housing 22. In this manner, the detachable handle 24 is easily, quickly, and very securely attached to the housing 22, using a single hand, and without need for any special tools.

To remove the detachable handle 24 from the housing 22, the lever 88 is rotated from the closed position (FIG. 4) to the open position (FIG. 5). As the lever 88 is rotated, the second radially extending portion 86 of the rotatable rod 82 is rotated in the threads formed in the wall 77 of the first housing aperture 72 in a loosening direction, thereby causing the end of the handle 24 to move slightly away from the housing 22. The rotation of the rod 22 also causes the radially extending and flattened distal end 84 of the rod 82 to be aligned with the slot 74 formed in the rod aperture 72, such that the rod 82 is removable from the aperture 72 by pulling the end of the handle 24 away from the tool housing 22. With the end of the handle having the rotatable rod 82 mounted therein removed from the housing 22, the handle 24 may be lifted away from the housing 22 to remove the tabs 80 from the second apertures 78 formed in the housing 22. In this manner, the detachable handle 24 is easily and quickly removed from the housing 22 using a single hand, and without need for any special tools.

The detachable handle 24 is preferably made of an electrically insulating material, such as hard plastic. The handle 24 may be formed of such a material in two complementary and symmetric halves by a conventional molding process. The two halves are then joined together to form the complete handle 24. The two handle halves may be joined together in a conventional manner, for example, using an adhesive. The two handle halves are also preferably screwed together, using screws or another type of fastener. For this purpose, screw holes 91 may be formed in the handle halves.

Figure 6:
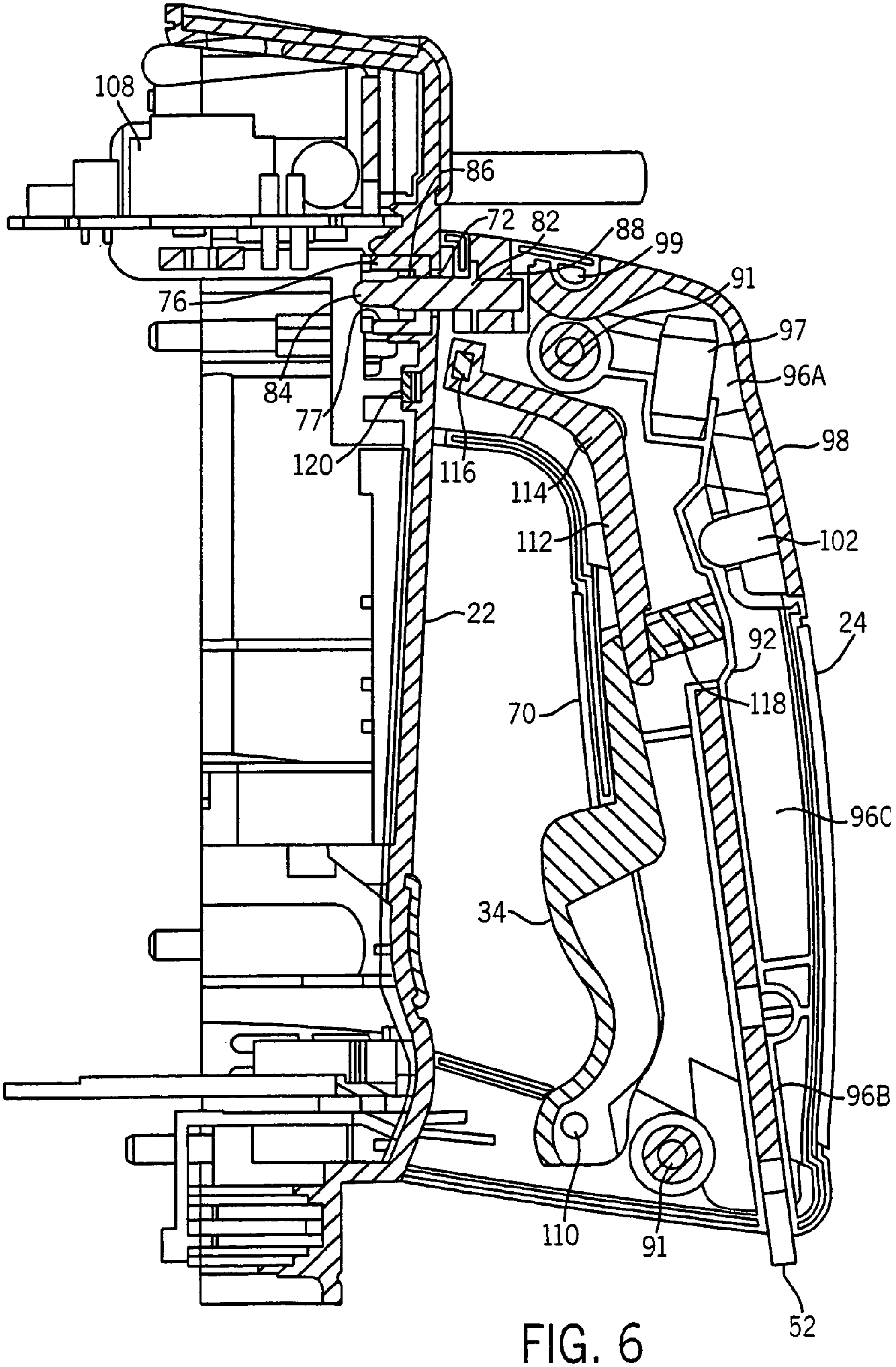
FIG. 6 is a cross-sectional view of a detachable handle coupled to the hand-held power tool, as taken along line 6–6 in FIG. 1.

As illustrated in FIG. 6, the handle 24 is substantially hollow, but includes molded internal structural elements 92 which provide strength and rigidity to the handle 24. The internal structural elements 92 of the handle 24 give the handle 24 the strength and rigidity of a solid handle, without requiring the amount of material required to form a solid handle, and with the light weight of a substantially hollow handle. Minimizing the weight of the handle 24 in this manner helps to minimize the fatigue experienced by an operator using the tool 20 with the handle 24 in place.

The structural elements 92 of the detachable handle 24 not only provide strength and rigidity to the handle 24, but also form hollow compartments or chambers 96 within the handle 24. Compartments formed by the structural elements 92 of the handle 24 may be positioned so as to be employed for convenient storage locations. For example, as illustrated in FIG. 6, a collet 97 and the wrench 52 for tightening the collet nut 48 may be stored conveniently in compartments 96A and 96B, respectively, formed inside the handle 24. A third compartment 96C may be provided for storage of, for example, extra cutting tool bits.

Storage compartments 96A and 96C are accessed via an aperture in the handle 24. To prevent objects stored in the compartments 96A and 96C from sliding out during use of the tool 20, a compartment door 98 may preferably be provided to cover the compartment aperture. The door 98 may preferably be a hinged door, which is attached via a hinge structure 99 to the detachable handle 24. The hinged door 98 may be opened about the hinge 99 structure to access the compartments 96A and 96C within the detachable handle 24. Ridges 100, or other gripping surfaces, may be formed on the hinged door 99 to facilitate grasping of the door 98 to open and close the door 98. Conventional latching tabs 102 may preferably be formed, e.g., on the inside of the door 98, to engage the inside of the detachable handle 24 to maintain the door 98 in a closed position when a tool 20 to which the handle 24 is attached is in operation.

The other accessible handle compartment 96B preferably may be specifically designed to hold the wrench 52 within the handle 24 when it is not in use. An aperture in the handle 24 provides access to the wrench compartment 96B. The size of the compartment 96B is such that the wrench 52 is held snugly therein to prevent it from sliding out during operation of the tool 20. As illustrated in FIGS. 1 and 2, a portion 104 of the handle 24 around the aperture to the wrench compartment 96B is reduced in width such that, when the wrench 52 is placed in the compartment 96B, the head of the wrench extends slightly from this portion 104 of the sides of the handle 24. This permits the head of the wrench 52 to be grasped to pull the wrench 52 from the compartment 96B.

The compartments 96 in the power tool handle 24 allow power tool accessories, such as extra cutting tool bits or collets 97, to be kept conveniently at hand, and separate from other tools and accessories. It should be noted that various storage compartments of different sizes and shapes than those described may be incorporated into the handle 24.

Also, various types of doors or other covers may be used to close off or access the compartments 96. Moreover, it is clear that a user may store other items within the storage compartments 96. In the embodiment described herein, however, one compartment 96B is specifically designed to hold the wrench 54.

As discussed above, the detachable handle 24 includes a trigger switch 34 mounted therein for turning the motor on and off when the detachable handle 24 is attached to the housing 22. The trigger switch 34 is preferably mounted adjacent to the gripping surface 70 of the detachable handle 24 on a side of the handle 24 facing the housing 22 when the detachable handle 24 is attached to the housing 22. The trigger switch 34 is preferably positioned on the detachable handle 24 such that the trigger switch 34 is operable by the little finger (pinkie) and ring finger of the hand of an operator when an operator is grasping the handle 24 for use of the tool 20 to which the handle is attached. The trigger switch 34 is thus preferably positioned at a lower end of the side of the detachable handle 24 facing the tool housing 22. This positioning of the trigger switch 34 on the detachable handle 24 allows the operator's stronger middle finger, index finger, and thumb to be used solely for holding and controlling the tool 20 to which the handle 24 is attached. The grip of these stronger fingers on the handle 24 need not be loosened to turn the tool on and off, as the trigger switch 34 provides for on/off operation of the tool 20 using two weaker fingers. Furthermore, the stronger fingers of the hand are less likely to become fatigued due to continuous holding of a trigger switch in an on position during operation of the tool. For example, there is a tendency to grasp a tool handle too strongly, and in a very fatiguing manner, when the same fingers are used for activating a trigger switch as are used for holding and controlling the tool itself.

The operator of a hand-held power tool 20 may activate the tool motor by actuating the trigger switch 34 mounted in the detachable handle 24. The actuation of the trigger switch 34 mounted in the detachable handle must be communicated to a motor controller 108 mounted in the motor housing 22. The motor controller 108 may be implemented as any circuit for controlling activation of the tool motor. Thus, the motor controller 108 may be implemented using a programmable device, such as a microprocessor, using discrete analog or digital components, or even using a simple wiring scheme. Preferably, the mechanism for coupling the trigger switch 34 in the detachable handle 24 to the motor controller 108 in the motor housing 20 does not interfere with the easy, quick, and secure attachment of the detachable handle 24 to the housing 22, or with the quick and easy removal of the handle 24 therefrom.

In accordance with an exemplary embodiment, the trigger switch 34 is coupled to the motor controller 108 without a direct mechanical connection between the trigger switch 34 and the motor controller 108 in the motor housing 22. This also allows for coupling the trigger switch 34 to the motor controller 108 without providing an additional aperture in the housing 22, through which potentially damaging debris may enter the motor housing 22 when the detachable handle 24 is not attached thereto. In a preferred embodiment, the trigger switch 34 is coupled to the motor controller 108 using a magnet 116 mounted on a moveable arm 112 which is mounted in the detachable handle 24. The moveable arm 102, and hence the magnet 116, is moved in response to actuation of the trigger switch 34. A magnetic field sensor 120 (e.g., a Hall effect sensor) is mounted in the tool housing 22 and coupled to the motor controller 108 for detecting movement of the magnet 116 when the trigger switch 34 is actuated to move the moveable arm 112.

The trigger switch 34 may be mounted in the detachable handle 24 so as to be rotatable about a pivot point 110. For example, as illustrated in FIG. 6, the trigger switch 34 may be mounted in the detachable handle 24 so as to be rotatable about a point 110 located near a bottom end of the trigger switch within the detachable handle 24. At the opposite end of the trigger switch, within the detachable handle 24, the end of the trigger switch 34 is placed in contact with a first end of the moveable arm 112. The moveable arm 112 is preferably mounted in the detachable handle 24 so as to be rotatable about a pivot point 114 located near the center of the moveable arm 112. The magnet 116 is mounted in or attached to the end of the moveable arm 112 in a conventional manner.

A compression spring 118 may be mounted in the detachable handle so as to press against the end of the moveable arm 112 where the moveable arm 112 contacts the trigger switch 34. Thus, the compression spring 118 biases the moveable arm 112 against the end of the trigger switch 34, thereby also biasing the trigger switch 34 into an "off" position. In this position, as illustrated in FIG. 6, the magnet 116 mounted in the moveable arm 112 is positioned at a spaced apart distance from the housing 22 of the tool 20 (when the detachable handle 24 is attached to the housing 22). When the trigger switch 34 is actuated, the switch 34 is rotated about pivot point 110. The end of the trigger switch 34 in contact with the moveable arm 112 presses the end of the moveable arm 112 against the biasing action of the compression spring 118, which compresses the compression spring 118 and rotates the moveable arm 112 about pivot point 114. This moves the magnet 116 into closer proximity to the tool housing 22 (when the detachable handle 24 is attached to the housing 22).

The magnetic field sensor 120, such as a Hall effect sensor, is mounted within the tool housing 22 opposite the position of the magnet 116 when the trigger switch 34 is actuated. The magnetic field sensor 120 may be any conventional sensor adapted to detect when the magnet 116 is moved forward into a position adjacent to the housing 22, i.e., when the magnet 116 is moved into the "on" position by an operator actuating the trigger switch 34. The magnetic field sensor 120 is coupled to the motor controller 108 in a conventional manner, so as to provide a signal to the motor controller 108 to turn the tool motor on when the magnet 116 is moved into the "on" position. The housing 22 is preferably made of a dielectric material, such that the magnetic field sensor 120 may be mounted within the housing 22, and operation thereof in combination with the magnet 116 to turn the tool motor on will not be affected by the presence of a portion of the housing 22 between the magnet 116 and magnetic field sensor 120. Thus, there is no need to form an additional aperture in the housing 22 to couple the trigger switch 34 to the motor controller 108.

When the trigger switch 34 is released, the compression spring 118 operates to rotate the trigger switch 34 and moveable arm 112 about pivot points 110 and 114, respectively, back into the "off" position. In this position, the magnet 116 is moved back away from the housing 22 a sufficient distance such that the magnetic field sensor 120 no longer detects the presence of the magnet 116. When the presence of the magnet is no longer detected by the sensor 120, it provides a signal (or ceases providing a signal) to the motor controller 108 to turn off the tool motor. Thus, the preferred mechanism for coupling the trigger switch 34 to the motor controller 108 does not employ a direct mechanical connection between trigger switch 34 and the motor controller 108. The mechanism for coupling the trigger switch 34 in the detachable handle 24 to the motor controller 108 in the motor housing 22 therefor does not interfere with the easy and quick attachment of the detachable handle 24 to, and removal of the detachable handle 24 from, the motor housing 22.

Figure 7:
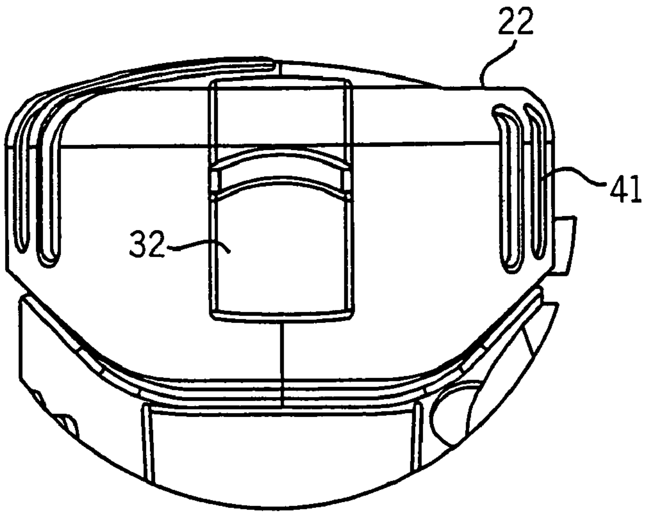
FIGS. 7, 8, and 9 are top views of the housing of the hand-held power tool shown in FIG. 1, showing a multiple-position on/off power in a first “off” position, a second trigger switch enabled position, and a third “on” position, respectively.
Figure 8:
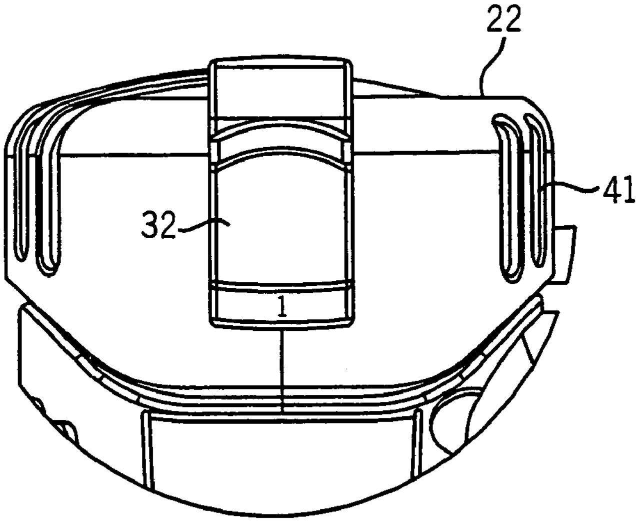
Figure 9:
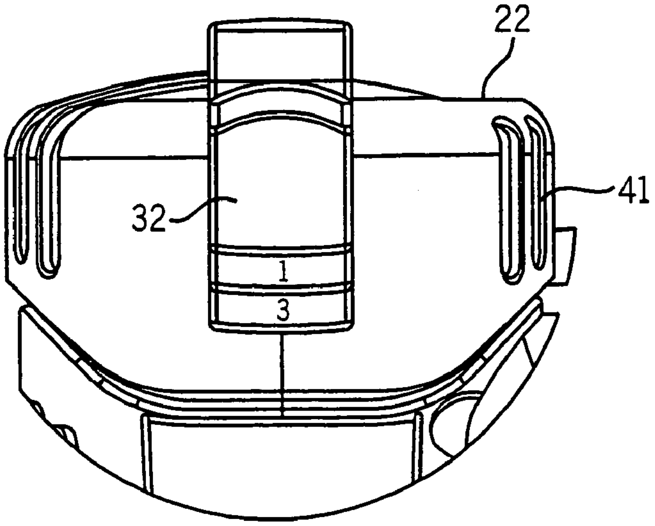

As discussed above, the hand-held power tool 20 preferably includes a multiple-position on/off power switch 32 mounted in the tool housing 22. The multiple-position on/off power switch 32 is preferably employed to both turn the tool motor on and off and to enable operation of the trigger switch 34 to turn the tool motor on and off. For example, in a first operating position of the multiple-position on/off switch 32, as illustrated in FIG. 7, the motor is turned off, and operation of the motor by the trigger switch 34 is disabled. Thus, with the multiple-position on/off switch in this first position, the motor cannot be turned on by actuating the trigger switch 34 mounted in the detachable handle 24 attached to the tool 20. In a second operating position of the multiple-position on/off switch 32, as illustrated in FIG. 8, the motor remains off, but the trigger switch 34 is enabled to turn the tool 20 on and off. Thus, when the multiple position on/off switch 32 is in this second position, the motor may be activated by actuating the trigger switch 34 mounted in the detachable handle 24 attached to the tool 20. The motor 20 is turned off by releasing the trigger switch 34. In a third operating position of the multiple position on/off switch, as illustrated in FIG. 9, the motor is turned on. In this position, as in the first position, the trigger switch 34 is also disabled. In other words, when the multiple position on/off switch 32 is in the third position, the motor is turned on, and may not be turned off by either actuating or releasing the trigger switch 34.

In an exemplary embodiment, the hand-held power tool provides for improved visibility of a workpiece at the point of a cut being made by the tool 20. In accordance with an exemplary embodiment, improved visibility under poor lighting conditions is provided by one or more high-output light emitting diodes (LEDs) 130 mounted in the tool housing 22 at the end thereof from which a motor shaft extends and to which a tool bit or other accessory is attached. The LEDs 130 mounted in the housing 22 are preferably turned on whenever the cutting tool motor is in operation.

Figure 11:
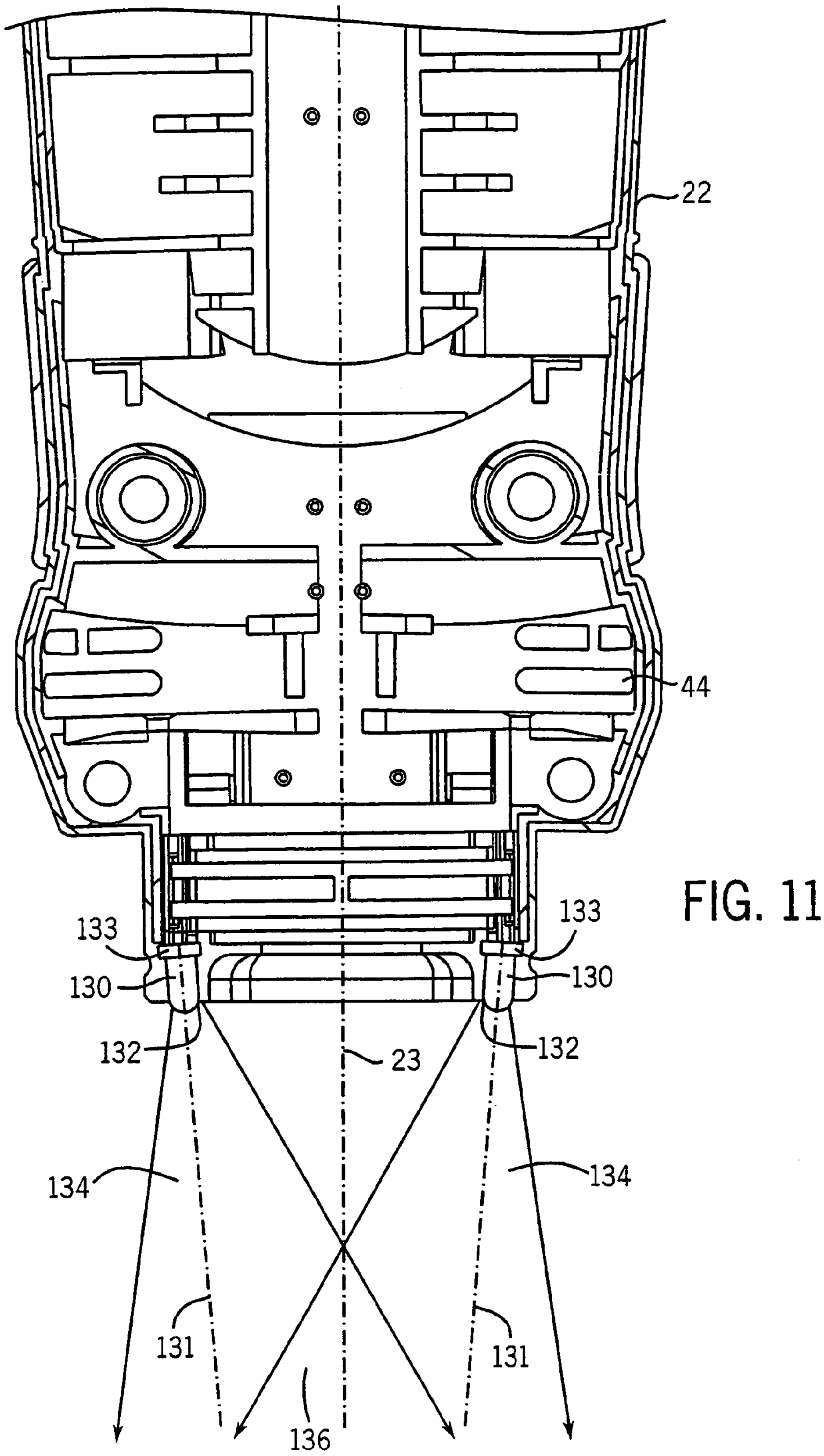
FIG. 11 is a cross-sectional view of a portion of the housing of the hand-held power tool shown in FIG. 1, showing the LEDs mounted at angles for directing crossing beams of light away from the housing.
Figure 12:
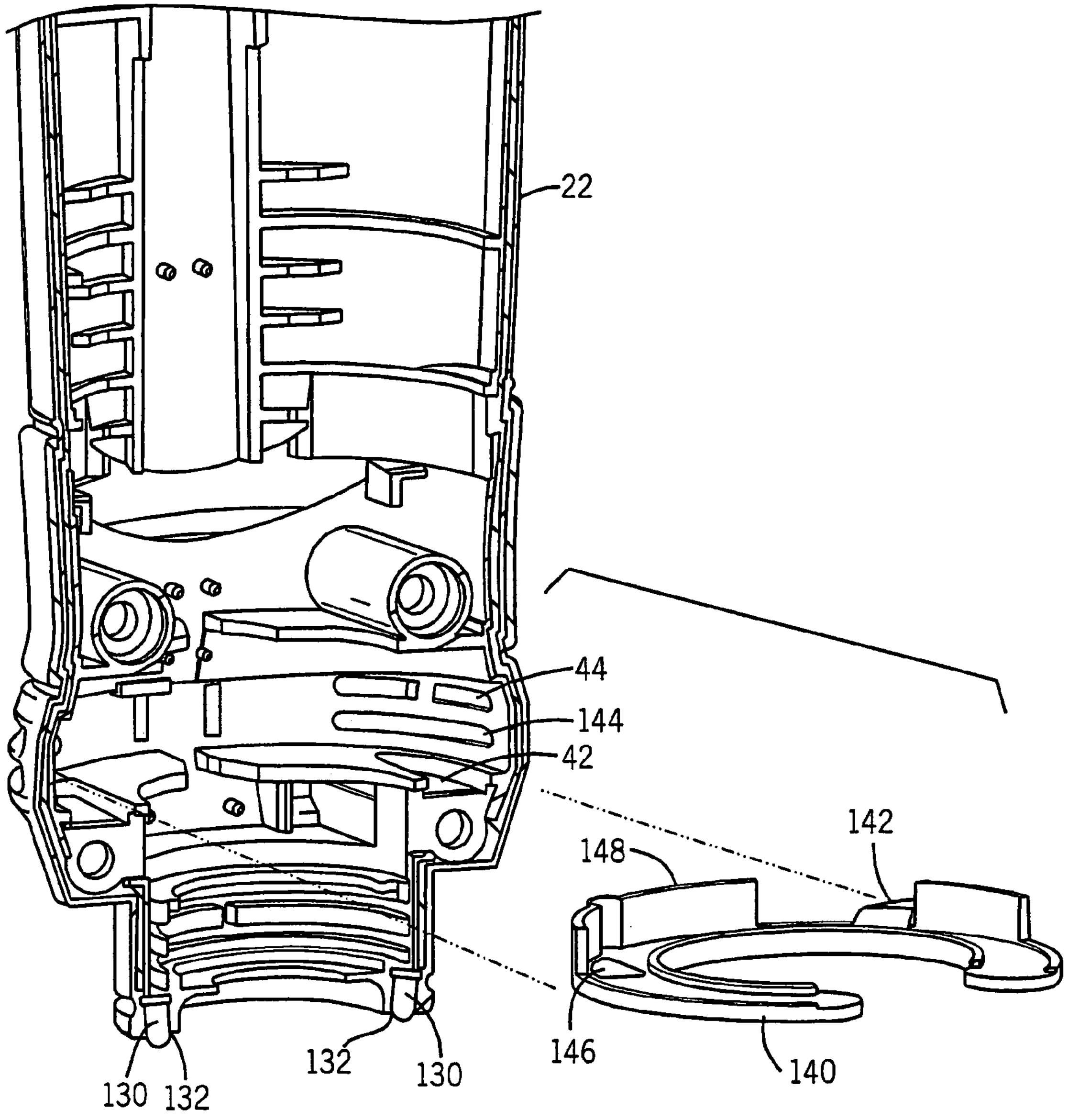
FIG. 12 is an exploded perspective view of the bottom portion of the housing illustrated in FIG. 11, showing a moveable air vent cover.
Figure 13:
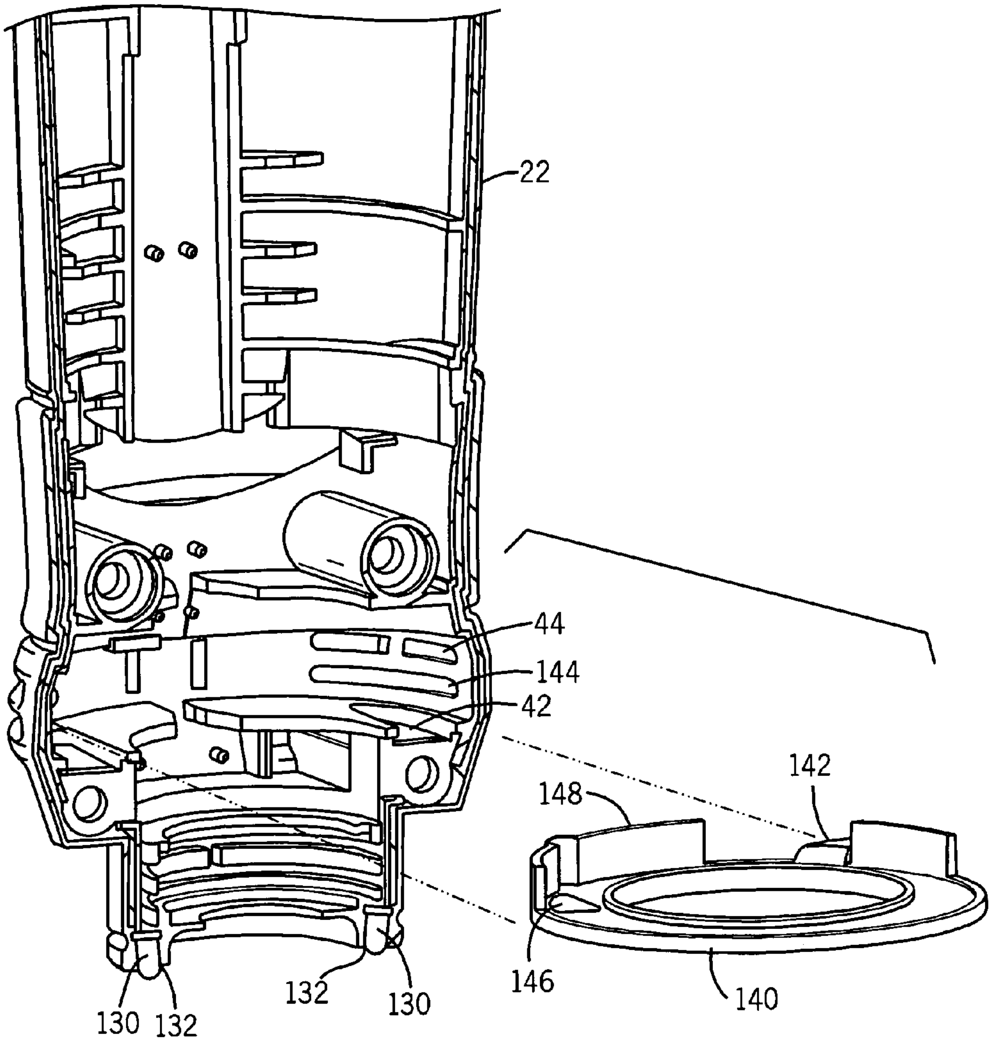
FIG. 13 is an exploded perspective view of the bottom portion of the housing illustrated in FIG. 11, showing a moveable air vent cover in the form of a complete ring.

As illustrated in FIGS. 10–12, one or more high-output LEDs 130 may be mounted, in a conventional manner, in LED apertures 132 (e.g., pockets, receptacles, etc.) formed in the end of the housing 22. The LEDs 130 may be implemented using commercially available high-output LEDs. Preferably, two or more LEDs 130 are mounted in the housing 22. The two or more LEDs 130 are preferably mounted in the housing 22 so as to be spaced apart around the mounting structure 46 for mounting, e.g., a tool bit to the cutting tool motor shaft. For example, two high-output LEDs 130 may be positioned on opposite sides of the motor shaft.

As illustrated in FIG. 11, the LEDs 130 are preferably mounted at angles within the housing 22. This may be achieved by forming the LED apertures 132 in the housing 22 at the desired angles with respect to the axis of the motor housing 22. As shown in FIG. 11, the central longitudinal axes 131 through the LEDs 130 (i.e., the axis perpendicular to the surface 133 on which the LEDs 130 are mounted) are arranged at acute angles with respect to the central longitudinal axis 23 of the motor housing 22. The angles at which the LEDs 130 are mounted in the housing 22 are preferably selected such that the beams of light 134 emitted by the LEDs 130 form an overlap or intersecting area 136 at the point of a cut when the tool 20 is in operation. For example, the angles with which the LEDs 130 are mounted in the housing 22 may be selected so that the beam overlap area 136 corresponds to the location where a tool bit enters a workpiece being cut thereby.

It should be understood that, although two LEDs 130 are illustrated in the exemplary embodiment shown in FIGS. 10–12, more than two LEDs may be mounted in the end of the motor housing 22 to illuminate a workpiece at the point of a cut, with the plurality of LEDs mounted in the housing 22 at angles to form an overlap area of light beams at the point of the cut.

As a workpiece, such as a piece of wood, is cut using the tool 20, cutting debris (e.g., sawdust) may deposit and build up on the workpiece surface at or near the point of cut made by the tool 20. This debris can interfere with the visibility of the operator trying to control the tool 20 to make a precise cut of a desired shape. For example, the debris may obscure a cut line marked on the workpiece by the operator. A tool 20 in accordance with an exemplary embodiment preferably includes one or more air vents 42, 44 formed in the bottom of the housing 22 to direct a flow of air onto a workpiece being cut to blow debris therefrom, thus enhancing visibility at the point of a cut. In an exemplary embodiment, the air vents 42 are formed in the housing 22 at the end of the housing 22 adjacent to the point where the motor shaft emerges from the housing 22, i.e., at the end of the shaft where a tool bit or other attachment is attached to the motor shaft.

In an exemplary embodiment, a fan may be provided within the housing 22. Preferably, the fan is attached or coupled to the motor shaft. When the motor is turned on, the fan is rotated at a high speed to draw air through the housing 22 and across the motor to thereby cool the motor. Air drawn through the housing by the fan is directed through the air vents onto the workpiece surface at the point of the cut, thereby blowing debris away from the point of the cut.

For some workpiece materials, it is desirable to not blow cutting debris away from the point of the cut. For example, a workpiece such as gypsum board drywall produces fine powdery cutting debris as a cut is made. It may be undesirable to blow this material into the air. Therefore, in accordance with an exemplary embodiment, a moveable air vent cover 140 is provided that allows the air vents 42 to be opened and closed. The air vent cover 42 may be positioned to either allow or prevent air flow from air vents 42 as desired. Preferably, the air vent cover 140 is mounted in the power tool housing for rotational movement therein.

A preferred and exemplary embodiment of a movable air vent cover 140 which may be employed is illustrated in FIG. 12. The exemplary air vent cover 140 is implemented as a substantially flat ring 140 which is mounted within the housing 22 adjacent to the air vents 42. The air vent cover 140 may be implemented as a complete or partially broken ring, as illustrated in FIG. 12. The air vent cover 140 is mounted for rotational movement within the housing 22 in a conventional manner.

A tab, lever, handle, or other structure 142 is preferably formed to extend radially from the air vent cover 140. The tab 142 is preferably formed to extend outward through a slot 144 formed in the sidewall of the housing 22 when the air vent cover 140 is positioned in the housing 22. Thus, an operator of the tool 20 is able to rotate the air vent cover 140 within the housing 22 by means of the tab 142 extending therefrom. The air vent cover 140 may be rotated between a first position allowing air flow through the air vents to be directed toward a workpiece and a second position blocking air flow toward the workpiece. Thus, an operator may direct a flow of air toward a workpiece to blow cutting debris therefrom and enhance visibility of the workpiece surface at the point of the cut or may block such air flow as desired.

The air vent cover 140 has one or more air vent apertures 146 formed therein. When the air vent cover 140 is rotated into the correct position, the air vent apertures 146 formed in the air vent cover 140 are aligned with the air vents 42, thereby allowing air flow through the motor housing 22 to exit through the air vents 42 to clear cutting debris away from the point of a cut. By rotating the air vent cover 140 using the tab 142, the air vent apertures 146 may be moved out of alignment with the air vents 42 such that the air vent cover 140 blocks the flow of air through the housing 22 from exiting through the air vents 42. Thus, by rotating the air vent cover 140 using the tab 142, the air vents 42 may be opened and closed to provide a flow of air to remove cutting debris away from a workpiece or to prevent such a flow of air.

The moveable air vent cover may also be formed to open vents 44 formed in the housing directed radially outward from the sides of the housing when the air vents directed toward the workpiece are closed. Air drawn through the motor housing to cool the motor may thereby be redirected in a direction radial to the tool, using the moveable air vent cover, so as to not disturb cutting debris from a workpiece being cut. When the flow of air through the air vents 42 is blocked by the air vent cover 140 (e.g., the apertures 42 formed in the air vent cover 140 are moved out of alignment with the air vents 42), the flow of cooling air flowing through the tool housing 22 exits the housing 22 through exhaust air vents 44 formed in the side of the housing 22, in a direction away from the workpiece being cut.

To increase the flow of air out of the air vents 42, at least a portion of the exhaust air vents 44 are blocked when the air vent cover 140 is positioned such that air vent apertures 146 are aligned with the air vents 42. One or more axially or vertically extending portions 148 may be formed on the air vent cover 140 for this purpose. As illustrated in FIG. 12, the axially extending portions 148 may be formed along the outer edge of the air vent cover 140. The axially extending portions 148 extend to a sufficient height, and are positioned on the air vent cover 140, such that the axially extending portions 148 may be positioned to block a flow of air through at least some of the air exhaust vents 44 when the air vent cover 140 is rotated into a position such that the air vent apertures 146 are aligned with the air vents 42. When the air vent cover 140 is rotated into a position such that the air vents 42 are covered by the air vent cover 140, the axially extending portions 148 move away from and no longer block the air exhaust vents 44, to allow increased flow of air therethrough. In this manner, air flow is redirected from the air exhaust vents 44 through the air vents 42 when the air vents 42 are opened to increase the flow of air through the air vents 42 and to remove cutting debris from a workpiece being cut.

The present invention provides a hand-held power tool that allows for increased control and visibility. Though described in detail herein with respect to a particular type of hand-held power cutting tool, it should be noted that the present invention is not limited in application to any particular tool design. The features of the present invention may be used with other types of hand-held power tools.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present inventions as expressed in the appended claims.

What is claimed is:

1. A hand-held power tool comprising:
a housing having a motor provided therein;
a cutting accessory coupled to the motor; and
means for selectively directing a flow of air toward and away from a point of cut of the cutting accessory;
whereby the flow of air acts to remove debris at the point of cut to improve visibility of the workpiece.

2. The hand-held power tool of claim 1, further comprising a motor shaft coupled to the motor, wherein the means for selectively directing a flow of air comprises a fan coupled to the motor shaft.

3. The hand-held power tool of claim 1, wherein the housing comprises at least one vent for directing air toward the point of cut.

4. The hand-held power tool of claim 1, further comprising at least one light emitting diode for directing a beam of light toward the point of cut.

5. A hand-held power tool comprising:
a housing having a motor provided therein;
a cutting accessory coupled to the motor; and
means for selectively directing a flow of air toward a point of cut of the cutting accessory:
whereby the flow of air acts to remove debris at the point of cut to improve visibility of the workpiece;
wherein the housing comprises at least one vent for directing air toward the point of cut; and
wherein the means for selectively directing a flow of air comprises an air vent cover selectively movable between a first position and a second position.

6. The hand-held power tool of claim 5, wherein the air vent cover includes at least one aperture that is aligned with the at least one vent for directing air toward the point of cut when the air vent cover is in the first position.

7. The hand-held power tool of claim 6, wherein the air vent cover restricts the flow of air through the at least one vent for directing air toward the point of cut when the air vent cover is in the second position.

8. The hand-held power tool of claim 7, wherein the housing comprises at least one vent for directing air away from the point of cut.

9. The hand-held power tool of claim 8, wherein the air vent cover is configured to direct air through the at least one vent for directing air away from the point of cut when the air vent cover is in the second position.

10. The hand-held power tool of claim 9, wherein the cover is configured to restrict the flow of air through the at least one vent for directing air away from the point of cut when the air vent cover is in the first position.

11. The hand-held power tool of claim 5, wherein the air vent cover comprises at least one tab extending through a slot formed in the housing for moving the air vent cover between the first position and the second position.

12. A hand-held power tool comprising:

a housing having a motor provided therein;

a first air vent formed in a first end of the housing; and an air vent cover provided in the housing and having a first aperture formed therethrough, the air vent cover movable between a first position and a second position;

wherein the first air vent and the first aperture formed in the air vent cover are aligned in the first position to direct air through the first air vent toward a point of cut when the motor is activated and wherein the first air vent and the first aperture formed in the air vent are not aligned in the second position such that air is not directed through the first air vent toward a point of cut.

13. The hand-held power tool of claim 12, further comprising a fan coupled to the motor.

14. The hand-held power tool of claim 12, further comprising a second air vent formed in a side of the housing.

15. The hand-held power tool of claim 14, wherein the air vent cover includes an extending portion configured to restrict the flow of air through the second air vent when the air vent cover is in the first position.

16. The hand-held power tool of claim 12, further comprising a lever coupled to the air vent cover for moving the air vent cover between the first and second positions.

17. The hand-held power tool of claim 12, further comprising a second air vent formed in the first end of the housing for directing air toward the point of cut and a second aperture formed in the air vent cover.

18. The hand-held power tool of claim 12, wherein the air vent cover has a shape of a complete ring or a partially broken ring.

19. The hand-held power tool of claim 12, wherein the air vent cover is rotatably mounted in the housing.

20. A hand-held power tool comprising:

a motor provided in a housing;

a first vent provided in the housing and configured to direct a flow of air toward a workpiece when the hand-held power tool is utilized to form cuts in the workpiece;

a second vent provided in a side of the housing and configured for directing a flow of air in a direction away from the workpiece; and a vent cover provided in the housing and configured to direct a flow of air through the first vent when the vent cover is in a first position and to restrict the flow of air through the first vent when the vent cover is in a second position.

21. The hand-held power tool of claim 20, further comprising a fan coupled to the motor to draw air through the housing and across the motor.

22. The hand-held power tool of claim 21, wherein the fan is also configured to generate a flow of air that may be directed through at least one of the first vent and the second vent.

23. The hand-held power tool of claim 20, wherein the vent cover includes at least one opening formed therethrough, the opening being aligned with the first vent when the vent cover is in the first position.

24. The hand-held power tool of claim 20, wherein the vent cover includes at least one extending portion that is aligned with the second vent when the vent cover is in the first position to restrict the flow of air through the second vent.

25. The hand-held power tool of claim 20, wherein the vent cover includes an opening formed therethrough and an extending portion, wherein in the second position the air is restricted from flowing through the first vent and is not restricted from flowing through the second vent.

26. The hand-held power tool of claim 20, wherein the vent cover includes at least one tab protruding through an aperture formed in the housing for selective positioning of the vent cover between the first and second positions.

* * * * *